United States Patent [19]
Buchele

[11] 3,910,365
[45] Oct. 7, 1975

[54] FLUID PRESSURE ACTUATED NET WEIGHING DEVICE WITH PNEUMATIC TARING

[75] Inventor: Wesley F. Buchele, Ames, Iowa

[73] Assignee: Iowa State Research Foundation, Inc., Ames, Iowa

[22] Filed: Feb. 26, 1975

[21] Appl. No.: 553,300

[52] U.S. Cl................................ 177/165; 177/208
[51] Int. Cl.².................... G01G 23/14; G01G 5/04
[58] Field of Search.................... 177/165, 208, 254

[56] References Cited
UNITED STATES PATENTS

| | | | |
|---|---|---|---|
| 2,882,037 | 4/1959 | Close et al. | 177/165 |
| 3,147,616 | 9/1964 | Rome | 177/208 X |
| 3,371,732 | 3/1968 | Stein | 177/208 |

*Primary Examiner*—George H. Miller, Jr.
*Attorney, Agent, or Firm*—Rudolph L. Lowell

[57] ABSTRACT

The weighing device comprises a tension load cell including an upper liquid chamber and a lower air chamber which has a volume much greater than the volume of the liquid chamber. The weight of a suspended load and the load supporting structure on the load cell are applied on both chambers. A gauge reads the liquid pressure in the upper chamber and a valve unit connectible to a source of air under pressure is connected to the air chamber. The load cell is tared by initially adjusting the air pressure in the lower chamber to produce a zero reading on the gauge. When a load is applied on the device, the volume displacement of the air chamber is small relative to the volume displacement of the liquid in the upper chamber. The volume of the air chamber thus remains substantially constant so that the gauge indicates directly the net weight of the applied load.

5 Claims, 4 Drawing Figures

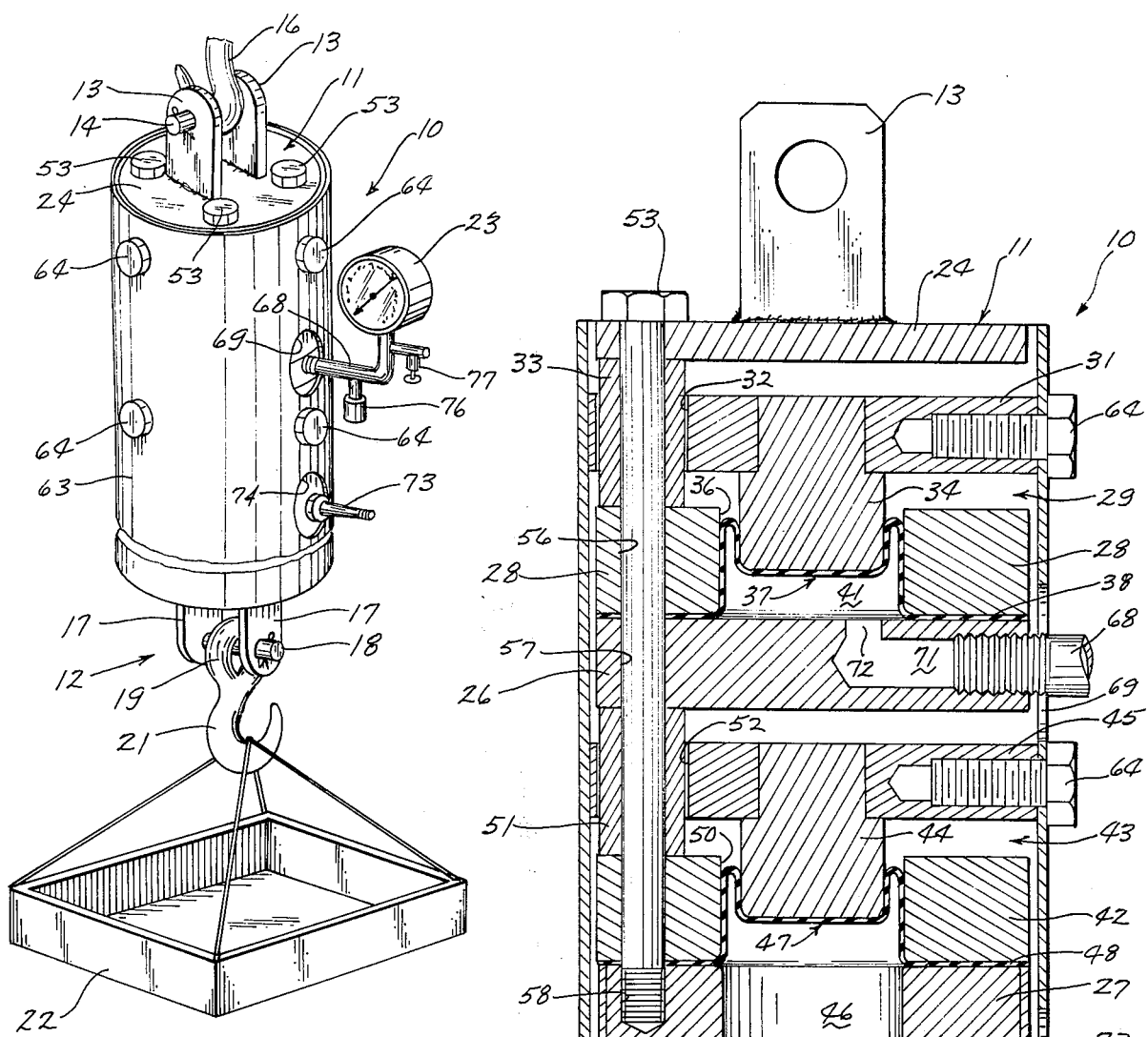
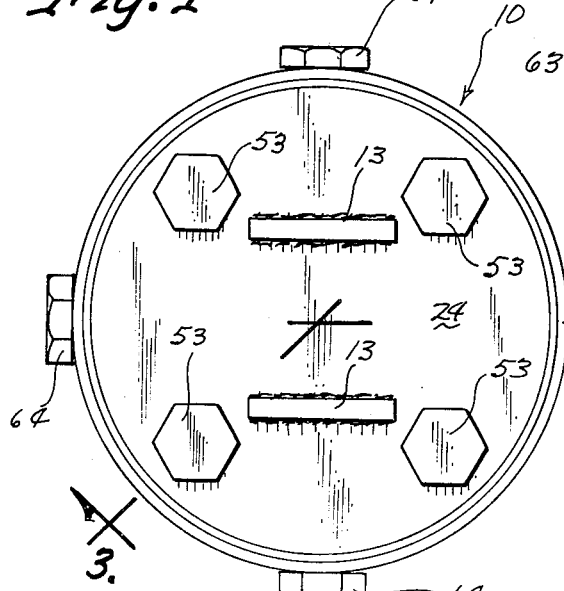
Fig. 1
Fig. 2
Fig. 3

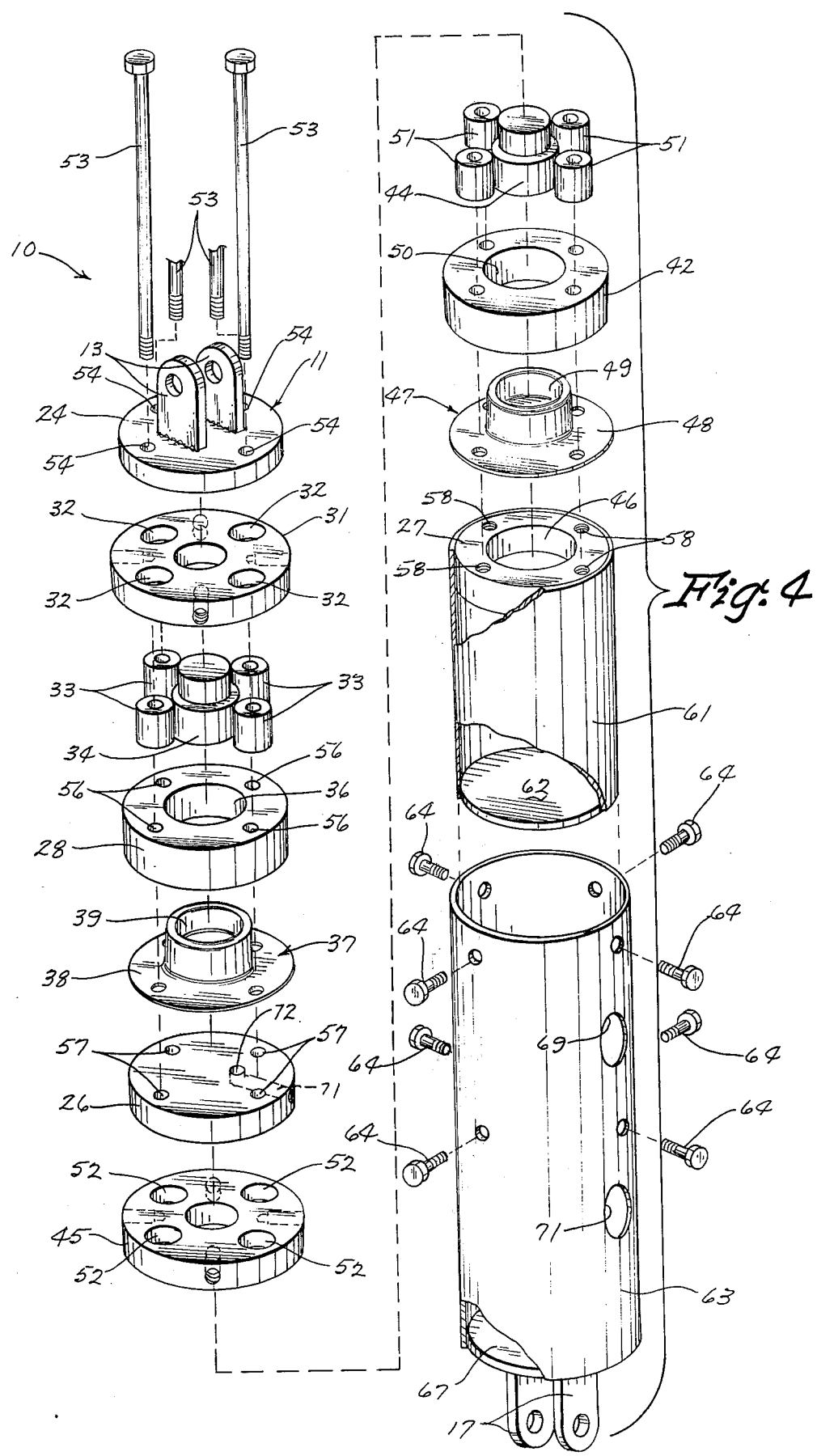

FLUID PRESSURE ACTUATED NET WEIGHING DEVICE WITH PNEUMATIC TARING

SUMMARY OF THE INVENTION

The net weight reading tension cell of this invention is of a compact and rugged construction, accurate in operation, and capable of being directly suspended from a ceiling beam, crane hook or the like to directly indicate the net weight of a load to be weighed. The cell is arranged within a cylindrically shaped load supporting structure, which constitutes a housing for the cell with only the read out gauge from the upper liquid chamber and the valve unit on the lower air chamber being located exteriorly of the housing. With a suspension mounting at its upper end and a depending load connector at its lower end the load cell is simply and easily suspended from a crane or the like and then quickly tared, for immediate use. The cell is comprised of a relatively few number of parts requiring small relative movement during use so that maintenance service is minimal.

BRIEF DESCRIPTION OF THE DRAWING

FIG. 1 is a perspective view of the tension load cell of this invention shown in assembly relation with a material or load holding tray;

FIG. 2 is a top plan view of the load cell;

FIG. 3 is a longitudinal sectional view of the load cell as seen along the line 3—3 of FIG. 2; and FIG. 4 is an exploded perspective view of the load cell.

DETAILED DESCRIPTION OF THE INVENTION

Referring to FIG. 1, the load cell of this invention, indicated generally as 10, includes a cylinder unit 11 positioned within a load supporting structure 12. Projected upwardly from the cylinder unit 11 is a pair of transversely spaced mounting ears 13 which carry a cross pin 14 engageable with a crane hook or the like 16. The supporting structure 12 has a pair of depending spaced ears 17 for receiving a cross pin 18 to which is connected the eye 19 of a load supporting hook 21. A material holding tray 22 or other suitable load holding means is shown suspended from the hook 21. The net weight of a load being weighed is indicated directly on a gauge means 23 located exteriorly of the load supporting structure 12, and illustrated as a Bourdon gauge.

The cylinder unit 11 (FIGS. 3 and 4) is of a composite structure and includes an upper wall 24 of a disk shape, an intermediate partition wall 26, and a lower wall 27. For the purpose of convenience, the section of the cylinder unit 11 defined by the upper wall 24 and intermediate wall 26 will be referred to as the top or hydraulic section of the cylinder unit; and the section of the cylinder unit defined by the intermediate wall 26 and lower wall 27 will be referred to as the bottom or pneumatic section of the cylinder unit 11.

The hydraulic cylinder section includes an annular wall member 28 positioned adjacent the upper surface of the intermediate wall 26. A piston assembly 29 for the hydraulic cylinder section is comprised of a flat disc body member 31 formed with a series of circumferentially spaced axially extended openings 32, illustrated as four in number and of a size to slidably receive therein corresponding tubular spacer bearings or sleeves 33.

A piston member 34 depends centrally from the body member 31 in a concentrically spaced relation within the central bore 36 of the wall member 28. A roll-out type diaphragm 37 has a peripheral portion 38 clamped between the intermediate wall 26 and the cylinder wall member 28 and a central portion 39 in bearing engagement with the lower surface of the piston member 34. There is thus formed within the central bore 36 of the wall member 28 a hydraulic chamber 41 defined by the intermediate wall 26 and the diaphragm 37 which constitutes a horizontal vertically movable wall for the chamber 41.

The pneumatic or bottom section of the cylinder unit 11 includes an annular wall member 42, similar to the wall member 28, which is positioned against the upper surface of the lower wall 27. A piston unit 43, similar in all respects to the piston unit 29, has a piston member 44 projected downwardly in a concentrically spaced relation within a central bore 50 formed in the wall member 42. A roll-out type diaphragm 47 has its peripheral portion 48 clamped between the wall members 27 and 42 and the central portion thereof in bearing engagement with the piston member 44. Tubular spacing collars 51 slidably receivable within corresponding circumferentially spaced openings 52 formed in the piston body member 45 maintain the wall member 42 and intermediate wall 26 in a spaced relation axially of the cylinder unit 11.

The hydraulic and pneumatic sections of the cylinder unit 11 are rigidly clamped together by means of four bolts 53 (FIGS. 2 and 3) extended through corresponding axially aligned spacing collars 33 and 51 and corresponding spaced openings 54, 56 and 57 formed respectively in the upper wall 24, intermediate wall 26, and cylinder wall 42 for threaded engagement within tapped holes 58 formed in the bottom wall 27.

The central bore 46 of the bottom wall member 27 forms a connecting passageway between the central bore 50 of the wall member 42 and a pneumatic air chamber 59 that forms part of the pneumatic section of the cylinder unit 11. The air chamber 59 includes a cylindrical wall or skirt 61 (FIGS. 3 and 4) having its upper end positioned about and secured to the peripheral surface of the lower wall member 27. The lower end of the air chamber is closed by a flat disc member 62 mounted within and having its peripheral surface secured to the skirt member 61. It is apparent that the air chamber 59 also includes the central bores of the wall 42 and lower wall 27 so as to have a volume appreciably greater than the volume of the hydraulic chamber 41 for a purpose to appear later. It has been found that satisfactory weighing results can be obtained when the pneumatic chamber 59 has a volume which is at least ten times greater than the volume of the hydraulic chamber 41.

The load supporting structure 12 comprises a cylindrical housing member 63 substantially co-extensive in length with the cylinder unit 11 and positioned thereabout in contact engagement with only the peripheral surfaces of the piston body members 31 and 44. The housing member is secured to the piston body members by radially extended machine screws 64 projected through the housing 63 for threadable engagement within circumferentially spaced tapped holes formed in the piston members. By virtue of the slidable movement of the piston assemblies 29 and 43, relative to the spacing collars 33 and 51 the piston assemblies and housing 63 are movable as a unit relative to the cylinder unit 11. The ears 17 are secured to and project downwardly from a circular end plate 67 which forms a lower wall for the housing 63. As best appears in FIG. 3, the upper end of the housing 63 is open.

The Bourdon gauge 23 has a fitting 68 (FIGS. 1 and 3) extended through an enlarged opening 69 formed in the housing wall 63 for threaded connection with a radial passage 71 in the intermediate wall 26 that has a lateral extension 72 open to the hydraulic chamber 41. An air valve unit 73 is extended through an enlarged opening 74 in the housing 63 for connection with the air chamber 59. The valve unit may be of the type commonly used on pneumatic tires.

In use, the load cell 10 is initially tared so that during its operation the net weight of the load to be weighed is indicated directly on the gauge 23. This is accomplished by suspending the load cell from the hook 16. The hydraulic chamber 41 is then filled with oil through a check valve unit 76 provided on the fitting 68, with any air in the chamber 41 being released through an air bleed valve 77 until only oil is released from the valve 77. The bleed valve 77 is suitably mounted on the gauge fitting 68. The load supporting hook 21, pin 18 and load holding tray 22 are then hung from the housing 63. The load supporting structure is thus comprised of the housing 63, the hook 21, the means such as 22 by which the load is to be carried on the hook 21 and the piston units 29 and 43.

This load supporting structure 12 is moved downwardly by gravity relative to the suspended cylinder unit 11 whereby the hydraulic chamber 41 and pneumatic chamber 59 are simultaneously contracted by the downward movement of the piston members 34 and 44 and resultant movement of the vertically movable horizontal walls or diaphragms 37 and 47. The volumetric displacement of the oil within the hydraulic chamber 41 increases the pressure therein so as to indicate on the gauge 23 the weight of the supporting structure 12.

To eliminate this weight of the supporting structures from being indicated on the gauge 23 during a weighing operation, air under pressure is supplied to the air chamber 59 through the air valve unit 73 until a zero reading is indicated on the gauge 23. In other words, the air pressure in the chamber 59 is adjusted to elevate the load supporting structure 12, and in turn the piston units 29 and 43, to remove the weight of the load supporting structure from being applied on the oil within the hydraulic chamber 41. In effect, the structure 12 is supported by the air pressure in the air chamber 59.

With the tension load cell thus tared the weight of the load to be weighed, which is carried on the load supporting structure, will alone act to displace the piston member 34 within the hydraulic chamber 41. It is apparent, of course, that this same load will simultaneously effect a corresponding displacement of the piston member 44 within the air chamber 59. However, due to the relatively small displacement of the piston member 34, there is little if any increase in the air pressure of the pneumatic chamber 59 due to the enlarged volume of the chamber 59 relative to the hydraulic chamber 41. Stated otherwise, the displacement of the piston member 34 within the hydraulic chamber 41 is so small that such movement does not significantly change the volume of the air chamber 59. As a result the pressure in the air chamber 59 remains substantially constant as the load is applied to the hydraulic section of the cylinder unit 11. The reading on the gauge 23, therefore, accurately indicates the net weight of the load being weighed.

Although the invention has been described with respect to a preferred embodiment thereof it is to be understood that it is not to be so limited since changes and modifications can be made therein which are within the full intended scope of the invention as defined by the appended claims.

I claim:

1. A fluid pressure-actuated weighing apparatus comprising:
   a. a load cell including a vertically movable floating piston assembly, a cylinder unit for said piston assembly having an upper liquid chamber, and a lower air chamber, said chambers having vertically movable horizontal side walls interconnected by said piston assembly for movement with said piston assembly,
   b. a fluid pressure-responsive weight indicating gauge connected to said upper liquid chamber,
   c. a load supporting structure secured to said piston assembly for transfer of the weight of said supporting structure and a load supported thereon to the liquid in said upper chamber and to the air in said lower chamber,
   d. a source of air under pressure, and
   e. means for admitting air under pressure from said source to, or releasing air from, said lower air chamber, prior to the application of any load on said load supporting structure, whereby the air pressure in said lower air chamber is adjustable to offset the weight of said load supporting structure to effect a zero reading on said gauge,
   f. said lower air chamber having a volume greater than the volume of said upper liquid chamber such that, in response to the application of a load on said load supporting structure the volume displacement thereof, relative to the volume displacement of said upper liquid chamber is of negligible value, whereby the reading on said gauge indicates the net weight of said load.

2. The fluid pressure-actuated weighing apparatus according to claim 1 wherein:
   a. said load supporting structure includes a cylindrical sleeve member mounted about said cylinder unit and secured to said piston assembly, and a load mounting member secured to the lower end of said sleeve member.

3. The fluid pressure-actuated weighing apparatus according to claim 1 wherein:
   a. said means for admitting air to, or releasing air from, said lower air chamber comprises a valve unit extended through said cylindrical sleeve member and secured to a side wall of said lower chamber,
   b. said cylindrical sleeve member having an enlarged opening therein through which said valve unit is projected.

4. The fluid pressure-actuated weighing apparatus according to claim 1 wherein:
   a. said lower air chamber has a volume at least 10 times greater than the volume of the upper liquid chamber.

5. The fluid pressure-actuated weighing apparatus according to claim 1 wherein:
   a. each of said movable side walls is comprised of a diaphragm member having a peripheral portion secured to the side wall of said cylinder unit.

* * * * *